United States Patent [19]
Harpell et al.

[11] Patent Number: 5,185,195
[45] Date of Patent: Feb. 9, 1993

[54] CONSTRUCTIONS HAVING IMPROVED PENETRATION RESISTANCE

[75] Inventors: Gary A. Harpell; Dusan C. Prevorsek, both of Morris, N.J.; David V. Cunningham, Chesterfield, Va.

[73] Assignee: Allied-Signal Inc., Morristown, N.J.

[21] Appl. No.: 615,673

[22] Filed: Nov. 19, 1990

[51] Int. Cl.$^5$ .............................................. B32B 3/06
[52] U.S. Cl. ........................... 428/102; 428/911; 2/2.5; 89/36.02; 89/36.05
[58] Field of Search ............... 428/102, 911; 2/2.5; 109/80, 84; 89/36.02, 36.05

[56] References Cited

U.S. PATENT DOCUMENTS

| | | | |
|---|---|---|---|
| 3,562,810 | 2/1971 | Davis | 2/2.5 |
| 3,582,988 | 6/1971 | Armellino | 2/2.5 |
| 3,641,638 | 2/1972 | Laible | 28/112 |
| 3,971,072 | 7/1976 | Armellino | 2/2.5 |
| 3,988,780 | 11/1976 | Armellino | 2/2.5 |
| 4,183,097 | 1/1980 | Mellian | 2/2.5 |
| 4,403,012 | 9/1983 | Harpell et al. | 428/290 |
| 4,413,110 | 11/1983 | Kavesh et al. | 526/348.1 |
| 4,443,506 | 4/1984 | Schmolmann et al. | 428/102 |
| 4,457,985 | 7/1984 | Harpell et al. | 428/224 |
| 4,510,200 | 4/1985 | Samousch | 428/252 |
| 4,522,871 | 6/1985 | Armellino, Jr. et al. | 428/252 |
| 4,543,286 | 9/1985 | Harpell et al. | 428/288 |
| 4,584,228 | 4/1986 | Droste | 428/182 |
| 4,608,717 | 9/1986 | Dunbavand | 2/2.5 |
| 4,613,535 | 9/1986 | Harpell et al. | 428/113 |
| 4,623,574 | 11/1986 | Harpell et al. | 428/113 |
| 4,650,710 | 3/1987 | Harpell et al. | 428/263 |
| 4,660,223 | 4/1987 | Fritch | 2/2.5 |
| 4,681,792 | 7/1987 | Harpell et al. | 428/102 |
| 4,737,401 | 4/1988 | Harpell et al. | 428/252 |
| 4,737,402 | 4/1988 | Harpell et al. | 428/252 |
| 4,911,061 | 3/1990 | Pivitt et al. | 89/36.02 |
| 4,916,000 | 4/1990 | Li et al. | 428/105 |
| 4,923,728 | 5/1990 | Snedeker | 428/52 |
| 4,989,266 | 2/1991 | Borgese et al. | 2/2.5 |

FOREIGN PATENT DOCUMENTS

| | | |
|---|---|---|
| 0241681 | 3/1986 | European Pat. Off. |
| 2931110 | 7/1979 | Fed. Rep. of Germany |
| 2124887 | 2/1984 | United Kingdom |
| 2130073 | 5/1984 | United Kingdom |

*Primary Examiner*—Donald P. Walsh
*Assistant Examiner*—Ngoclan T. Mai
*Attorney, Agent, or Firm*—R. C. Stewart, II; G. H. Fuchs; D. L. Webster

[57] ABSTRACT

An improved article of the type comprising a plurality of flexible fibrous layers at least two of which are secured together by a securing means, said improvements comprising a securing means which comprises at least two adjacent paths wherein the distance between said paths is less than about ⅛ in.

47 Claims, 5 Drawing Sheets

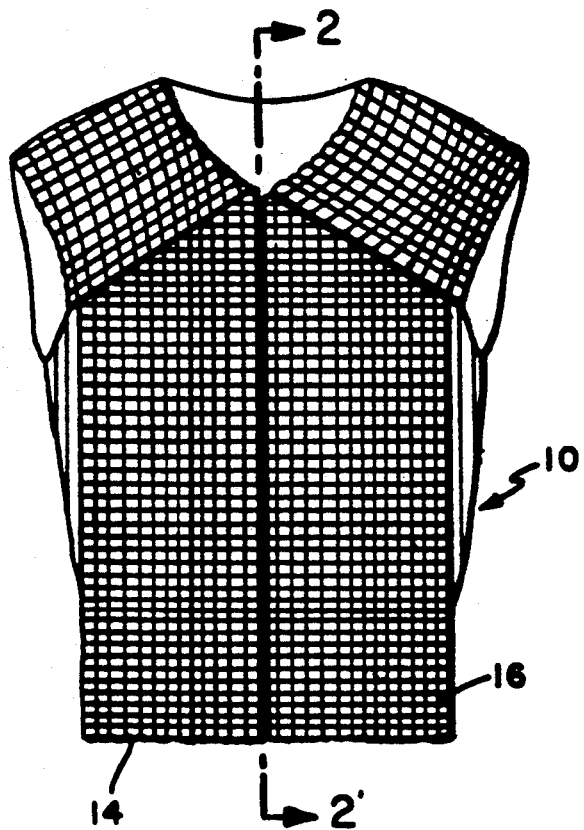
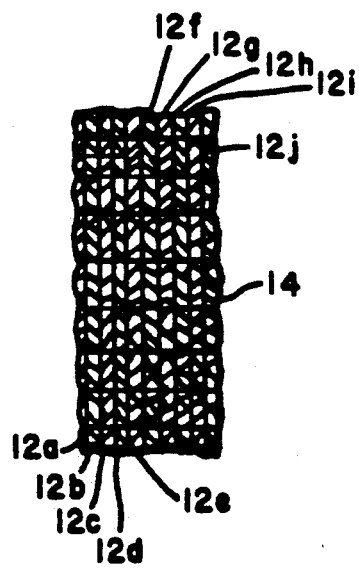
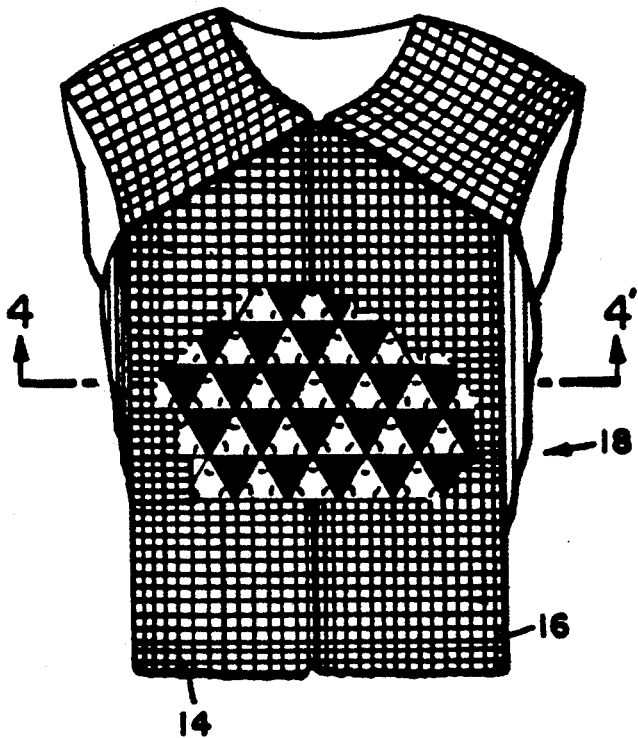
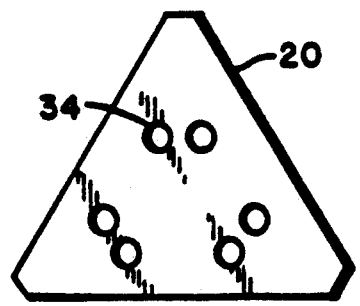

CONSTRUCTIONS HAVING IMPROVED PENETRATION RESISTANCE

BACKGROUND OF THE INVENTION

1. Field of the Invention

This invention relates to articles having improved penetration resistance. More particularly, this invention relates to such articles which are fiber based and which are especially suitable for fabrication into penetration resistant articles such as body armor, as for example, bulletproof vests.

2. Prior Art

Ballistic articles such as bulletproof vests, helmets, structural members of helicopters and other military equipment, vehicle panels, briefcases, raincoats and umbrellas containing high strength fibers are known. Fibers conventionally used include aramid fibers such as poly (phenylenediamine terephthalamide), graphite fibers, nylon fibers, ceramic fibers, glass fibers and the like. For many applications, such as vests or parts of vests, the fibers are used in a woven or knitted fabric. For many of the applications, the fibers are encapsulated or embedded in a matrix material.

U.S. Pat. Nos. 3,971,072 and 3,988,780 relate to light weight armor and method of fabrication of same. Reinforced body armor and the like is fabricated by securing a thin ballistic metal outer shell to a plurality of layers of flexible material having qualities resistant to ballistic penetration. The layers of material are sewn together along paths spaced within a selected predetermined range, so as to restrict movement of the fabric layers in lateral and longitudinal directions and to compact the layers in an elastic mass thereby to provide improved resistance to penetration of the material by a ballistic missile and to reduce back target distortion.

U.S. Pat. No. 4,183,097 relates to a contoured, all-fabric, lightweight, body armor garment for the protection of the torso of a woman against small arms missiles and spall which comprises a contoured front protective armor panel composed of a plurality of superposed layers of ballistically protective plies of fabric made of aramid polymer yarns, the front protective armor panel being contoured by providing overlapping seams joining two side sections to a central section of the panel so as to cause the front protective armor panel to be contoured to the curvature of the bust of a female wearer of the body armor garment to impart good ballistic protection and comfort to the wearer.

U.S. Pat. No. 3,855,632 relates to an undershirt type garment made of soft, absorbent, cotton-like material, stitched thereto and covering the chest and abdomen areas and the back area of the wearer's torso. Inserted between each of the panels and the portions of the shirt which they cover is a pad formed of a number of sheets of closely woven, heavy gage nylon thread. The sheets are stitched together and to the shirt generally along their outer edges so that the major portions of the sheets are generally free of positive securement to each other and thus may flex and move to some extent relative to each other. Thus, the garment, in the padded areas, is substantially bullet-proof and yet is lightweight, flexible, non-bulky and perspiration absorbent.

U.S. Pat. No. 4,522,871 relates to an improved ballistic material comprising a multiplicity of plies of ballistic cloth woven with an aramid, e.g., Kevlar ®, thread, one or more of which plies are treated with resorcinol formaldehyde latex to coat the aramid threads and fill the interstices between the threads of a treated ply.

U.S. Pat. No. 4,510,200 relates to material useful in bulletproof clothing formed from a number of laminates arranged one on top of another. The laminates are preferably formed of a substrate coated with a crushed thermosettable foam that, in turn, covered with a surface film, which may be an acrylic polymer. The films should form the outermost layers of the composite material which together with the foam layer, prevent degradation of the substrate, which is typically formed of fabric woven from Kevlar.

U.S. Pat. No. 4,331,091 describes three-dimensional thick fabrics made from a laminate of fabric plies held together by yarns looped through holes in the structure.

U.S. Pat. No. 4,584,228 layers of textile fabric or foil superimposed on a shock absorber, in which the shock absorber is a three dimensional fabric with waffle-like surface.

U.S. Pat. Nos. 4,623,574; 4,748,064; 4,916,000; 4,403,012; 4,457,985; 4,650,710; 4,681,792; 4,737,401; 4,543,286; 4,563,392; and 4,501,856 describe ballistic resistant articles which comprise a fibrous network such as a fabric or 0°/90° uniaxial pregreg in a matrix.

SUMMARY OF THE INVENTION

This invention relates to a penetration resistant article comprising a plurality of flexible fibrous layers, said fibrous layers comprised of a network of fibers, at least two of said layers secured together by a securing means extending along at least two adjacent spaced paths wherein the distance between at least two of said parallel paths is less than ⅛ of an inch (0.3175 cm).

Another embodiment of this invention relates to a penetration resistant article comprising:

(a) a plurality of flexible fibrous layers comprised of a network of fibers, at least two of said fibrous layers secured together by a securing means extending along at least two parallel spaced paths wherein the distance between said parallel paths is less than about ⅛ inch (0.03175 cm); and (b) at least one rigid layer which comprises a plurality of rigid bodies arranged with said plurality of flexible fibrous layers.

As used herein, the "penetration resistance" of the article is the resistance to penetration by a designated threat, as for example, a bullet, an ice pick, a knife or the like. The penetration resistance for designated threat can be expressed as the ratio of peak force (F) for designated threat (projectile, velocity, and other threat parameters known to those of skill in the art to affect peak force) divided by the areal density (ADT) of the target. As used herein, the "peak force", is the maximum force exerted by a threat to penetrate a designated target using a model 1331 high speed Instron tester having an impact velocity of about 12 ft./sec (3.66 m/sec) and where the target strike face area has a diameter of 3 in.(7.6 cm) (See the Examples); and as used herein, the "areal density" or "ADT" is the ratio of total target weight to the target strike face area.

Several advantages flow from this invention. For example, the articles of this invention are relatively flexible, and exhibit relatively improved penetration resistance as compared to other articles of the same construction and composition but having differing securing means. Other advantages include a reduced thickness, elimination of wrinkling, better control of component flexibility and better control of panel thickness by precursors composition and tension of the securing means. Still other advantages include reduction in fiber degradation from the weaving process.

BRIEF DESCRIPTION OF THE DRAWINGS

The invention will be more fully understood and further advantages will become apparent when reference is made to the following detailed description of the invention and the accompanying drawings in which:

FIG. 1 is a front view of body armor, in the form of a vest, fabricated from reinforced ballistic material in accordance with this invention.

FIG. 2 is an enlarged fragmentary sectional view taken on line 2—2 of FIG. 1 showing a plurality of ballistic resistant fibrous layers with securing means securing the fibrous layers together;

FIG. 3 is a front perspective view of a body armor of this invention having certain selected components cut away for purposes of illustration.

FIG. 10 is a frontal view of a truncated equilateral triangle.

DETAILED DESCRIPTION OF THE PREFERRED EMBODIMENT OF THE INVENTION

Figure 4:
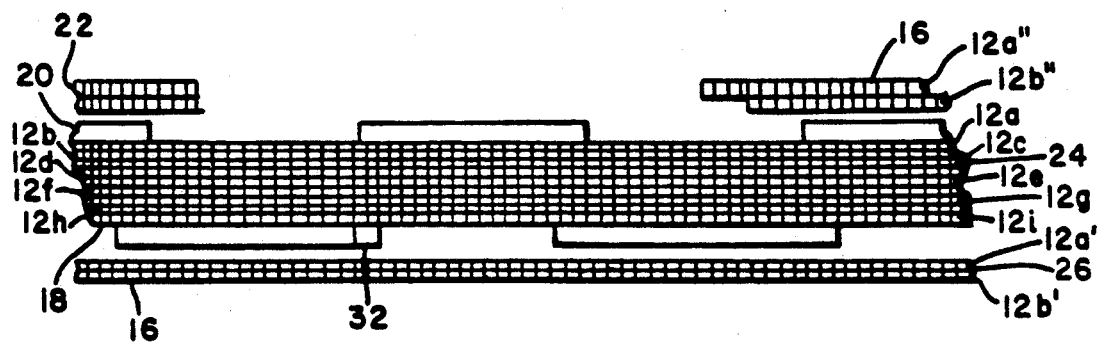
FIG. 4 is an enlarged fragmentary sectional view of the body armor of this invention of FIG. 3 taken on line 4—4 which includes a plurality of rigid ballistic resistant elements on outer surfaces of a plurality of fibrous layers.

The preferred embodiments of this invention will be better understood by those of skill in the art by reference to the above figures. The preferred embodiments of this invention illustrated in the figures are not intended to be exhaustive or to limit the invention to the precise form disclosed. They are chosen to describe or to best explain the principles of the invention and its application and practical use to thereby enable others skilled in the art to best utilize the invention.

Referring to FIGS. 1 and 2, the numeral 10 indicates a ballistic resistant article 10, which in this preferred embodiment of the invention is a penetration resistant body armor which comprises a plurality of fibrous layers 12. As depicted in FIG. 2, article 10 is comprised of ten layers $12_a$ to $12_j$. However, the number of layers 12 included in article 10 may vary widely, provided that at least two layers are present. In general, the number of layers in any embodiment will vary depending on the degree ballistic protection and flexibility desired. The number of fibrous layers 12 is preferably from 2 to about 70, more preferably from about 5 to about 60 and most preferably from about 20 to about 50.

As shown in FIGS. 1 and 2, ten fibrous layers $12_a$ to $12_j$ are each secured together by a horizontal securing means 14 and vertical securing means 16, which in the illustrative embodiments of the invention depicted in the figures is stitching. While in the embodiment of the figures all fibrous layers $12_a$ to $12_j$ are secured together, it is contemplated that the number of layers 12 secured together may be as few as two, or any number of layers 12 in article 10 in any combination. In the preferred embodiments of the invention where the number of layers 12 is more than about 20, all the layers are not secured together. In these embodiments, from about 2 to about 20 layers, preferably from 2 to about 12 layers, more preferably from about 2 to about 10 layers and most preferably from about 2 to about 8 are secured together forming a plurality of packets (not depicted). These packets may in turn be secured together by a securing means.

An important feature of one aspect of the invention is the distance between adjacent paths of the horizontal securing means 14, and vertical securing means 16 holding fibrous layers $12_a$ to $12_j$ together. In this embodiment of the invention, it has been found that the distance between adjacent securing means 14 and 16 must be less than about ⅛ in. (0.3175 cm) to provide the beneficial effects of this invention. If the distance is equal to or greater than ⅛ in. (0.3175 cm) the construction allows fibers to the pushed out of the path of the penetration threat without being strained to their breaking elongation point, resulting in a decrease in the degree of penetration resistance. In general, the lower limit to the spacing between adjacent securing means 14 to 16 is not critical and theoretically such adjacent securing means 14 to 16 can be as close as possible. However, for practical reasons and for convenience, the distance is usually not less than about 1/64 in. (0.40 mm). In the preferred embodiments of the invention, the spacing between securing means 14 and 16 is from about 1/32 in. (0.79 mm) to about 1/10 in. (2.5 mm). More preferred preferred spacings are from about 1/16 in. (1.6 mm) to about 1/10 in. (2.5 mm) and most preferred spacings are from about 1/16 in. (2.5 mm) to about 1/12 in. (2.1 mm).

The distance between the elements of securing means interconnecting the various fibrous layers may vary widely. The securing means 14 and 16 may be a continuous interconnection of various layers 12 where the path forming means 14 and 16 does not include any region where the various layers 12 are not interconnected. Securing means 14 and 16 may also be discontinuous, in which event the paths forming securing means 14 and 16 are comprised of parts where the various layers 12 are interconnected and other regions where there are no such interconnections. In the embodiment of FIGS. 1 and 2 where the various layers 12 are stitched together, the distance between various elements of securing means 14 and 16 is the stitch length which can vary widely. In the preferred embodiments of the invention the distance between individual securing elements, for example, the stitch length is equal to or less than about 6.4 mm. In general, the lower limit may vary widely. More preferred distances are equal to or less than about 4 mm, and most preferred distances are from about 1 mm to about 4 mm with the distances of choice being from about 2.5 mm to about 3.5 mm.

In the illustrative embodiment of FIGS. 1 and 2, article 10 has been depicted with two sets of adjacent and substantially parallel securing means 14 and substantially parallel securing means 16 which are orthogonal with respect to each other intersecting at 90° angles forming a plurality of substantially rectangular or square shaped patterns on the surface of article 10 less than ⅛ in. (0.3175 cm), preferably equal to about 3.2 mm. This represents the most preferred aspects of the invention. It is contemplated that a single set of paths can be employed Moreover, the paths need not be parallel and may intersect other than at right angles. The only requirement is that at least two of the paths are adjacent, and that the distance between these adjacent paths is less than about ⅛ in. (0.3175 cm).

Layers 12 can be secured and interconnected together by any suitable securing means 14 and 16, so long as at least two of the securing means 14 and 16 interconnecting various layers 12 are within the critical spacing distances discussed adjacent. Illustrative of suitable securing means are stapling, riveting, welding, heat bonding, adhesives, sewing and other means known to those of skill in the art.

In FIGS. 1 and 2, stitches are utilized to form securing means 14 and 16. Stitching and sewing methods such as lock stitching, chain stitching, zig-zag stitching and the like constitute the preferred securing means for use in this invention. The thread used in these preferred embodiments can vary widely, but preferably a relatively high tensile modulus (equal to or greater than about 200 grams/denier) and a relatively high tenacity (equal to or greater than about 15 grams/denier) fiber is used. All tensile properties are evaluated by pulling a 10 in (25.4 cm) fiber length clamped in barrel clamps at a rate of 10 in/min (25.4 cm/min) on an Instron Tensile Tester. In the preferred embodiments of the invention, the tensile modulus is from about 400 to about 3000 grams/denier and the tenacity is from about 20 to about 50 grams/denier, more preferably the tensile modulus is from about 1000 to about 3000 grams/denier and the tenacity is from about 25 to about 50 grams/denier and most preferably the tensile modulus is from about 1500 to about 3000 grams/denier and the tenacity is from about 30 to about 50 grams/denier. Useful threads and fibers may vary widely and will be described in more detail herein below in the discussion of fiber for use in the fabrication of fibrous layers 12. However, the thread or fiber used in stitching means is preferably an aramid fiber or thread, (as for example Kevlar® 29, 49, 129, and 149 poly(p-phenylene terephthalamide) fiber or thread), an extended chain polyethylene thread or fiber (as for example Spectra® 900 and Spectra® 1000 polyethylene fibers), or a mixture thereof. In the embodiment of the invention depicted in FIGS. 1 and 2, the weight percent of the thread having a longitudinal axis perpendicular to the plane of layers 12 is preferably at least about 2% by wgt., more preferably from about 2 to about 30% by wgt., and most preferably from about 4 to about 15% by wgt. All weight percents are based on the total weight of the article.

Fibrous layer 12 comprises a network of fibers. For purposes of the present invention, fiber is defined as an elongated body, the length dimension of which is much greater than the dimensions of width and thickness. Accordingly, the term fiber as used herein includes a monofilament elongated body, a multifilament elongated body, ribbon, strip and the like having regular or irregular cross sections. The term fibers includes a plurality of any one or combination of the above.

The cross-section of fibers for use in this invention may vary widely Useful fibers may have a circular cross-section, oblong cross-section or irregular or regular multi-lobal cross-section having one or more regular or irregular lobes projecting from the linear or longitudinal axis of the fibers. In the particularly preferred embodiments of the invention, the fibers are of substantially circular or oblong cross-section and in the most preferred embodiments are of circular or substantially circular cross-section.

Fibrous layer 12 may be formed from fibers alone, or from fibers coated with a suitable polymer, as for example, polyolefins, vinyl esters, phenolics, allylics, silicones, polyamides, polyesters, polydienes such as a polybutadiene, polyurethanes, and the like. Fibrous layer 14 may also comprise a network of a fibers dispersed in a polymeric matrix as for example a matrix of one or more of the above referenced polymers to form a flexible composite as described in more detail in U.S. Pat. Nos. 4,623,574; 4,748,064; 4,916,000; 4,403,012; 4,457,985; 4,650,710; 4,681,792; 4,737,401; 4,543,286; 4,563,392; and 4,501,856. Regardless of the construction, fibrous layer 14 is such that article 10 has the required degree of flexibility.

The fibers in fibrous layer 12 may be arranged in networks having various configurations. For example, a plurality of filaments can be grouped together to form twisted or untwisted yarn bundles in various alignments. The filaments or yarn may be formed as a felt, knitted or woven (plain, basket, satin and crow feet weaves, etc.) into a network, fabricated into non-woven fabric, arranged in parallel array, layered, or formed into a woven fabric by any of a variety of conventional techniques. Among these techniques, for ballistic resistance applications we prefer to use those variations commonly employed in the preparation of aramid fabrics for ballistic-resistant articles. For example, the techniques described in U.S. Pat. No. 4,181,768 and in M. R. Silyquist et al., *J. Macromol Sci. Chem.*, A7(1), pp. 203 et. seq. (1973) are particularly suitable.

The construction of fibrous layer 12 also influences the resistance to displacement of the fibers in fibrous layer 12. By fiber layer construction, we consider such features as, for example, consolidated v. non-consolidated layers, heat set v. non-heat set layers, twisted fiber v. non-twisted fiber-containing layers, woven v. non-woven layer weave type and density, and fiber density.

The type of fiber used in the fabrication of fibrous layer 12 may vary widely and can be any inorganic or organic fibers capable of use in a fibrous layer. Preferred fibers for use in the practice of this invention are those having a tenacity equal to or greater than about 10 grams/denier (g/d), a tensile modulus equal to or greater than about 150 g/d and an energy-to-break equal to or greater than about 30 joules/grams. The tensile properties are determined by an Instron Tensile Tester by pulling a 10 in (25.4 cm) length of the fiber, clamped in barrel clamps, at a rate of 10 in/min (25.4 cm/min). Among these particularly preferred embodiments, most preferred are those embodiments in which the tenacity of the fiber is equal to or greater than about 25 g/d, the tensile modulus is equal to or greater than about 1000 g/d, and the energy-to-break is equal to or greater than about 35 joules/grams. In the practice of this invention, fibers of choice have a tenacity equal to or greater than about 30 g/d, the tensile modulus is equal to or greater than about 1300 g/d and the energy-to-break is equal to or greater than about 40 joules/grams.

The denier of the fiber may vary widely. In general, fiber denier is equal to or less than about 4000. In the preferred embodiments of the invention, fiber denier is from about 10 to about 4000, the more preferred embodiments of the invention fiber denier is from about 10 to about 1000 and in the most preferred embodiments of the invention, fiber denier is from about 10 to about 400.

Useful inorganic fibers include S-glass fibers, E-glass fibers, carbon fibers, boron fibers, alumina fibers, zirconia silica fibers, alumina-silicate fibers and the like.

Illustrative of useful organic fibers are those composed of polyesters, polyolefins, polyetheramides, fluoropolymers, polyethers, celluloses, phenolics, polyesteramides, polyurethanes, epoxies, aminoplastics, polysulfones, polyetherketones, polyetherether-ketones, polyesterimides, polyphenylene sulfides, polyether acryl ketones, poly(amideimides), and polyimides. Illustrative of other useful organic filaments are those composed of aramids (aromatic polyamides), such as poly(m-xylylene adipamide), poly)p-xylyene sebacamide) poly2,2,2-trimethyl-hexamethylene terephthalamide) (Kevlar); aliphatic and cycloaliphatic polyamides, such as the copolyamide of 30% hexamethylene diammonium isophthalate and 70% hexamethylene diammonium adipate, the copolyamide of up to 30% bis-(-amidocyclohexyl)methylene, terephthalic acid and caprolactam, polyhexamethylene adipamide (nylon 66), poly(butyrolactam) (nylon 4), poly (9-aminononanoic acid) (nylon 9), poly(enantholactam) (nylon 7), poly(capryllactam) (nylon 8), polycaprolactam (nylon 6), poly (p-phenylene terephthalamide), polyhexamethylene sebacamide (nylon 6,10), polyaminoundecanamide(nylon 11), polydodeconolactam (nylon 2), polyhexamethylene isophthalamide, polyhexamethylene terephthalamide, polycaproamide, poly(nonamethylene azelamide) (nylon 9,9), poly(decamethylene azelamide) (nylon 10,9), poly(decamethylene sebacamide) (nylon 10,10), poly[bis-(4-aminocyclothexyl) methane 1,10-decanedicarboxamide] methane 1,10-decanedicarboxamide] (Qiana) (trans), or combination thereof; and aliphatic, cycloaliphatic and aromatic polyesters such as poly (1,4-cyclohexlidene dimethyl eneterephathalate) cis and trans, poly(ethylene-1, 5-naphthalate), poly (ethylene-2, 6-naphthalate), poly (1,4-cyclohexane dimethylene terephthalate) trans, poly (decamethylene terephthalate), poly(ethylene terephthalate), poly(ethylene isophthalate), poly(ethylene oxybenzoate), poly(-para-hydroxy benzoate), poly(dimethylpropiolactone), poly(decamethylene adipate), poly(ethylene succinate), poly(ethylene azelate), poly(decamethylene sebacate), poly-dimethylpropiolactone), and the like.

Also illustrative of useful organic filaments are those of liquid crystalline polymers such as lyotropic liquid crystalline polymers which include polypeptides such as poly(γ-benzyl L-glutamate and the like; aromatic polyamides such as poly(1,4-benzamide), poly(chloro-1,4-phenylene terephthalamide), poly(1,4-phenylene fumaramide), poly(chloro-1,4-phenylene fumaramide), poly(4,4'-benzanilide trans, trans-muconamide), poly (1,4-phenylene mesaconamide), poly(1,4-phenylene) (trans-1,4-cyclohexylene amide), poly (chloro-1,4-phenylene 2. 5-pyridine amide), poly(3. 3'-dimethyl-4, 4'-biphenylene 2. 5 pyridine amide), poly (1,4-phenylene 4, 4'-stilbene amide), poly (chloro-1,4-phenylene 4,4'-stilbene amide), poly(chloro-1, 4-phenylene 4,4'-stilbene amide), poly(1,4-phenylene 4, 4''-azobenzene amide), poly(4,4'-azobenzene 4,4'-azobenzene amide), poly(1,4-phenylene 4,4'-azoxybenzene amide), poly(4,4'-azobenzene 4,4'-azoxybenzene amide), poly(1,4-cyclohexylene 4,4'-azobenzene amide), poly(4,4'-azobenzene terephthal amide), poly(3, 8-phenanthridinone terephthal amide), poly(4,4'-biphenylene terephthal amide), poly(4,4'-biphenylene 4,4'-bibenzo amide), poly(1,4-phenylene 4,4'-bibenzo amide), poly(1,4-phenylene 4,4'-terephenylene amide), poly(1,4-phenylene 2,6-naphthal amide), poly(1,5-naphthylene terephthal amide), poly (3,3'-dimethyl-4,4-biphenylene terephthal amide), poly(3,3'-dimethoxy-4,4'-biphenylene terephthal amide), poly(3,3'-dimethoxy-4,4-biphenylene - bibenzo amide) and the like; polyoxamides such as those derived from 2,2' dimethyl4,4'diamino biphenyl and chloro-1,4-phenylene diamine; polyhydrazides such as poly chloroterephthalic hydrozide, 2,5-pyridine dicarboxylic acid hydrazide) poly(terephthalic hydrazide), poly(terephthalic-chloroterephthalic hydrazide) and the like; poly(amide-hydrazides) such as poly (terephthaloyl 1,4 amino-benzhydrazide) and those prepared from 4-amino-benzhydrazide, oxalic dihydrazide, terephthalic dihydrazide and para-aromatic diacid chlorides; polyesters such as those of the compositions include poly(oxy-trans-1,4-cyclohexyleneoxycarbonyl-trans-1,4-cyclohexylenecarbonyl-trans-1,4phenyleneoxyterephthalo yl) in methylene chloride-o-cresol poly(oxy-trans-1,4-cyclohexylene-oxycarbonyl-trans-1,4-cyclohexylenecarbonyl-β-oxy-(2-methyl-1,4-phenylene)oxy-terephthaloyl)] in 1,1,2,2-tetrachloro-ethane-o-cyclohexyleneoxycarbonyl-trans-1,4-cyclohexylenecarbonyl-β-oxy(2-methyl-1,3-phe -nylene)oxy-terephthaloyl] in o-chlorophenol and the like; polyazomethines such as those prepared from 4,4'-diaminobenzanilide and terephthalaldephide, methyl-1,4-phenylenediamine and terephthalaldelyde and the like; polyisocyanides such as poly(-phenyl ethyl isocyanide), poly(n-octyl isocyanide) and the like; polyisocyanates such as poly (n-alkyl isocyanates) as for example poly(n-butyl isocyanate), poly(n-hexyl isocyanate) and the like; lyotropic crystalline polymers with heterocyclic units such as poly(1,4-phenylene-2,6-benzobisoxazole)(PBO), poly(1,4-phenylene-1,3,4-oxadiazole), poly (1,4-phenylene-2,6-benzobisimidazole), poly [2,5(6)-benzimidozole] (AB-PBI), poly[2,6(1,4-phnenylene)-4-phenylquinoline], poly[1,1'-biphenylene)-6,6'-bis(4-phenylquinoline)] and the like; polyorganophosphazines such as polyphosphazine, polybisphenoxyphosphazine, poly]bis(2,2,2'trifluoroethyelene) phosphazine and the like metal polymers such as those derived by condensation of trans-bis (tri-n-butylphosphine) platinum dichloride with a bisacetylene or trans-bis (tri-n-butylphosphine)bis(1,4-butadinynyl) platinum and similar combinations in the presence of cuprous iodine and an amide; cellulose and cellulose derivatives such as esters of cellulose as for example triacetate cellulose, acetate cellulose, acetate-butyrate cellulose, nitrate cellulose, and sulfate cellulose, ethers of cellulose as for example, ethyl ether cellulose, hydroxymethyl ether cellulose, hydroxypropyl ether cellulose, carboxymethyl ether cellulose, ethyl hydroxyethyl ether cellulose, cyanoethylethyl ether cellulose, ether-esters of cellulose as for example acetoxyethyl ether cellulose and benzoyloxypropyl ether cellulose, and urethane cellulose as for example phenyl urethane cellulose; thermotropic liquid crystalline polymers such as delluloses and their derivatives as for example hydroxypropyl cellulose, ethyl cellulose propionoxypropyl cellulose, thermotropic liquid crystalline polymers such as celluloses and their derivatives as for example hydroxypropyl cellulose, ethyl cellulose propionoxypropyl cellulose; thermotropic copolyesters as for example copolymers of 6-hydroxy-2-naphthoic acid and p-hydroxy benzoic acid, copolymers of 6-hydroxy-2-naphthoic acid, terephthalic acid and p-amino phenol, copolymers and 6-hydroxy-2-naphthoic acid, terephthalic acid and hydroquinone, copolymers of 6-hydroxy-2-naphtcic acid, p-hydroxy benzoic acid, hydroquinone and terephthalic acid, copolymers of 2,6-naphthalene dicarboxylic acid, terephthalic acid, isophthalic acid and hydroquinone, copolymers of 2,6-napthalene dicarboxylic acid and terephthalic acid, copolymers of p-hydroxybenzoic acid, terephthalic acid and 4,4'-dihydroxydiphenyl, copolymers of p-hydroxybenzoic acid, terephthalic acid, isophthalic acid and 4,4'-dihydroxydiphenyl, p-hydroxybenzoic acid, isophthalic acid, hydroquinone and 4,4'-dihydroxybenzophenone, copolymers of phenylterephthalic acid and hydroquinone, copolymers of chlorohydroquinone, terephthalic acid and p-acetoxy cinnamic acid, copolymers of chlorophydroquinone, terephthalic acid and ethylene dioxy-4,4'-dibenzoic acid, copolymers of hydroquinone, methylhydroquinone, p-hydroxybenzoic acid and isophthalic acid, copolymers of (1-phenylethyl)hydroquinone, terephthalic acid and hydroquinone, and copolymers of poly(ethylene terephthalate) and p-hydroxybenzoic acid; and thermotropic polyamides and thermotropic copoly(amide-esters).

Also illustrative of useful organic filaments for use in the fabrication of fibrous layer 14 are those composed of extended chain polymers formed by polymerization of $\alpha,\beta$- unsaturated monomers of the formula:

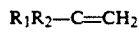

$$R_1R_2-C=CH_2$$

wherein:

$R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. Illustrative of such polymers of $\alpha,\beta$-unsaturated monomers are polymers including polystyrene, polyethylene, polypropylene, poly(1-octadecene), polyisobutylene, poly(1-pentene), poly(2-methylstyrene), poly(4-methylstyrene), poly(1-hexene), poly(1-pentene), poly(4-methoxystrene), poly(5-methyl-1-hexene), poly(4-methylpentene), poly (1-butene), polyvinyl chloride, polybutylene, polyacrylonitrile, poly(methyl pentene-1), poly(vinyl alcohol), poly(vinyl acetate), poly(vinyl butyral), poly(vinyl chloride), poly(vinylidene chloride), vinyl chloride-vinyl acetate chloride copolymer, poly(vinylidene fluoride), poly(methyl acrylate), poly(methyl methacrylate), poly(methacrylonitrile), poly(acrylamide), poly(vinyl fluoride), poly(vinyl formal), poly (3-methyl-1-butene), poly(1-pentene), poly(4-methyl-1-butene), poly(1-pentene), poly(4-methyl-1-pentence, poly (1-hexane) poly(5-methyl-1-hexene), poly(1-octadecene), poly(vinyl-cyclopentane), poly(-vinylcyclothexane), poly(a-vinyl-naphthalene), poly(vinyl methyl ether), Poly(vinyl-ethylether), poly(vinyl propylether), poly(vinyl carbazole), poly(vinyl pyrrolidone), poly(2-chlorostyrene), poly(4-chlorostyrene), poly(vinyl formate), poly(vinyl butyl ether), poly(vinyl octyl ether), poly(vinyl methyl ketone), poly(methylisopropenyl ketone), poly(4-phenylstyrene) and the like In the most preferred embodiments of the invention, composite articles include a fiber network, which may include a high molecular weight polyethylene fiber, a high molecular weight polypropylene fiber, an aramide fiber, a high molecular weight polyvinyl alcohol fiber, a liquid crystalline polymers such as liquid crystalline copolyester and mixtures thereof U.S. Pat. No. 4,457,985 generally discusses such high molecular weight polyethylene and polypropylene fiber, and the disclosure of this patent is hereby incorporated by reference to the extent that it is not inconsistent herewith. In the case of polyethylene, suitable fiber are those of molecular weight of at least 150,000, preferably at least one million and more preferably between two million and five million. Such extended chain polyethylene (ECPE) filaments may be grown in solution as described in U.S. Pat. No. 4,137,394 to Meihuzen et al., or U.S. Pat. No. 4,356,138 of Kavesh et al., or a filament spun from a solution to form a gel structure, as described in German Off. 3,004,699 and GB 2051667, and especially described in U.S Pat. No. 4,551,296 (see EPA 64,167, published Nov. 10, 1982). As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated by reference. Depending upon the formation technique, the draw ratio and temperatures, and other conditions, a variety of properties can be imparted to these fiber. The tenacity of the fibers should be at least 15 grams/denier, preferably at least 20 grams/denier, more preferably at least 25 grams/denier and most preferably at least 30 grams/denier. Similarly, the tensile modulus of the fibers, as measured by an Instron tensile testing machine, is at least 300 grams/denier, preferably at least 500 grams/denier and more preferably at least 1,000 grams/denier and most preferably at least 1,200 grams/denier. These highest values for tensile modulus and tenacity are generally obtainable only by employing solution grown or gel filament processes.

Similarly, highly oriented polypropylene fibers of molecular weight at least 200,000, preferably at least one million and more preferably at least two million may be used. Such high molecular weight polypropylene may be formed into reasonably well oriented fibers by the techniques prescribed in the various references referred to above, and especially by the technique of U.S. Pat. No. 4,551,296. Since polypropylene is a much less crystalline material than polyethylene and contains pendant methyl groups, tenacity values achievable with polypropylene are generally substantially lower than the corresponding value for polyethylene. Accordingly, a suitable tenacity is at least 8 grams/denier, with a preferred tenacity being at least 11 grams/denier. The tensile modulus for polypropylene is at least 160 grams/denier, preferably at least 200 grams/denier. The particularly preferred ranges for the above-described parameters can advantageously provide improved performance in the final article.

High molecular weight polyvinyl alcohol filaments having high tensile modulus are described in U.S. Pat. No. 4,440,711 to Y. Kwon et al., which is hereby incorporated by reference to the extent it is not inconsistent herewith. In the case of polyvinyl alcohol (PV-OH), PV-OH fiber of molecular weight of at least about 200,000.

Particularly useful PV-OH fiber should have a modulus of at least about 300 g/d, a tenacity of at least 7 g/d (preferably at least about 10 g/d, more preferably at about 14 g/d, and most preferably at least about 17 g/d), and an energy-to-break of at least about 8 joules/gram. PV-OH fibers having a weight average molecular weight of at least about 200,000, a tenacity of at least about 10 g/d, a modulus of at least about 300 g/d, and an energy-to-break of about 8 joules/gram are more useful in producing a ballistic resistant article. PV-OH fiber having such properties can be produced, for example, by the process disclosed in U.S. Pat. No. 4,599,267.

In the case of aramid fibers, suitable aramid fibers formed principally from aromatic polyamide are described in U.S. Pat. No. 3,671,542, which is hereby incorporated by reference. Preferred aramid fiber will have a tenacity of at least about 20 g/d, a tensile modulus of at least about 400 g/d and an energy-to-break at least about 8 joules/gram, and particularly preferred aramid fibers will have a tenacity of at least about 20 g/d, a modulus of at least about 480 g/d and an energy-to-break of at least about 20 joules/gram. Most preferred aramid fibers will have a tenacity of at least about 20 g/denier, a modulus of at least about 900 g/denier and an energy-to-break of at least about 30 joules/gram. For example, poly(phenylene terephthalamide) fibers produced commercially by Dupont Corporation under the trade name of Kevlar ® 29, 49, 129 and 149 having moderately high moduli and tenacity values are particularly useful in forming ballistic resistant composites. Also useful in the practice of this invention is poly(metaphenylene isophthalamide) fibers produced commercially by Dupont under the trade name Nomex ®.

In the case of liquid crystal copolyesters, suitable fibers are disclosed, for example, in U.S. Pat. Nos. 3,975,487; 4,118,372; and 4,161,470, hereby incorporated by reference. Tenacities of about 15 to about 30 g/d and preferably about 20 to about 25 g/d, and modulus of about 500 to 1500 g/d and preferably about 1000 to about 1200 g/d, are particularly desirable.

Figure 5:
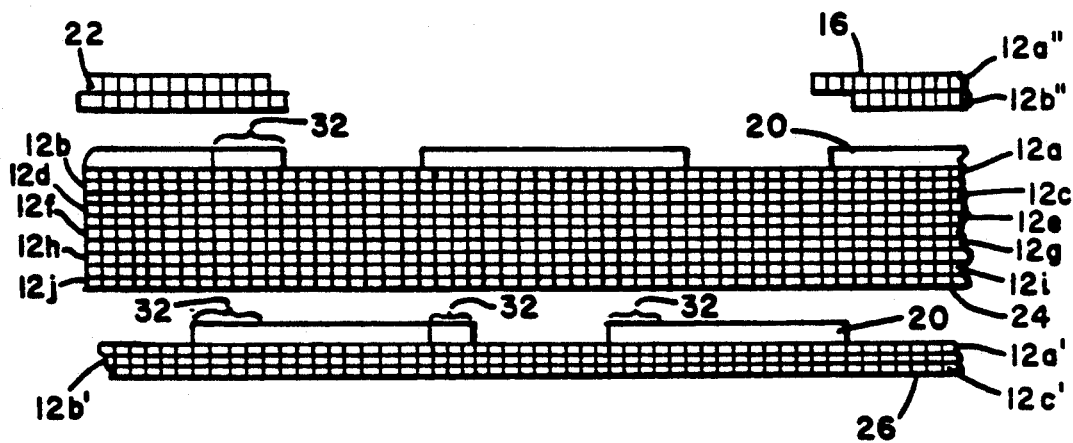
FIG. 5 is an enlarged fragmental sectional view of the body armor of this invention FIG. 3 taken on line 4—4 which includes a plurality of rigid ballistic elements on one side of two fibrous layers.
Figure 6:
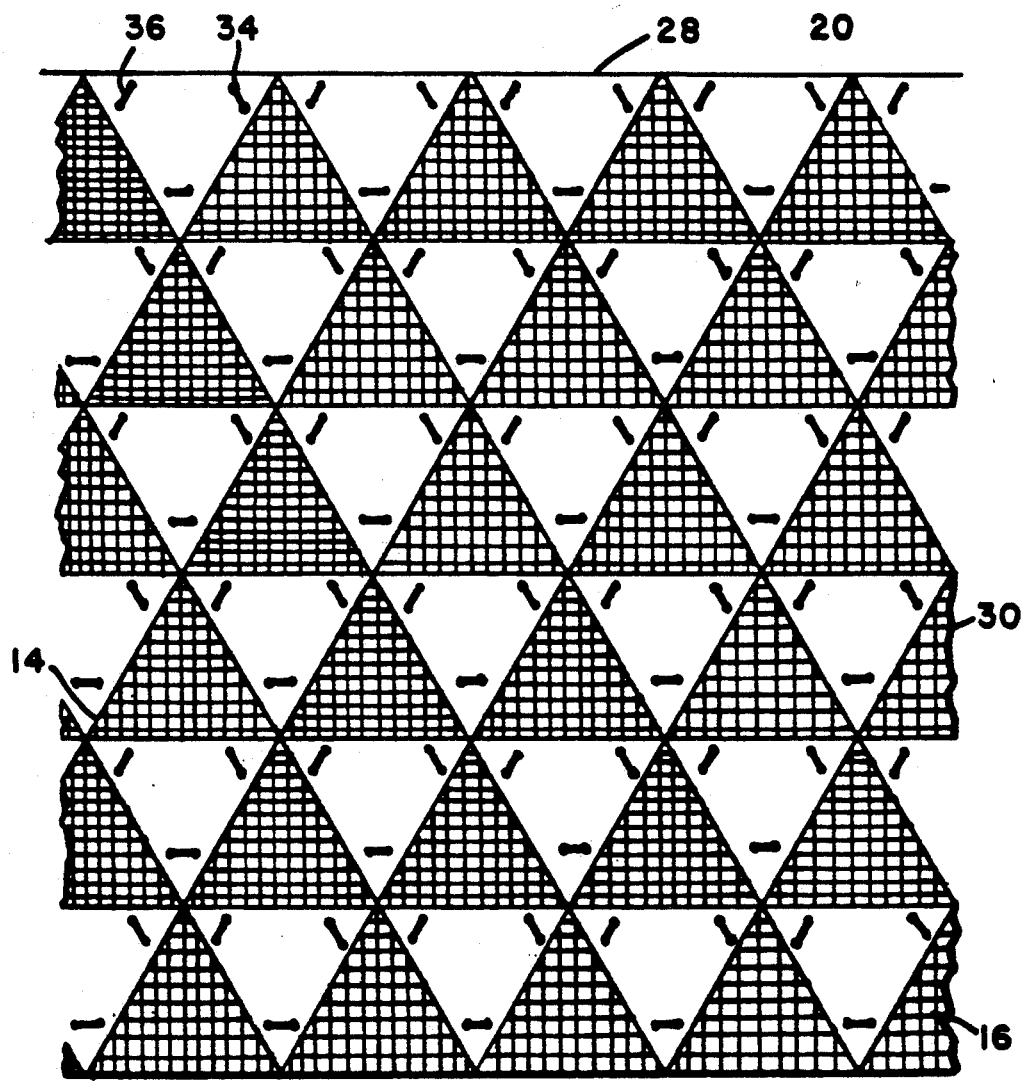
FIG. 6 is a fragmentary frontal view of the body armor of this invention of FIG. 3 in which certain selected layers have been cut away to depict equilateral triangular shaped rigid panels laminated and sewn on both sides of a stitched fabric.

FIGS. 3, 4, 5 and 6 depict fragmentary frontal and cross-sectional views of an article 18 which differs from article 10 of FIGS. 1 and 2 by the addition of a plurality of substantially planar or planar bodies 20 of various geometrical shapes which are affixed to a surface of two or more layers 12 or to both surfaces of a plurality of layers 12 of article 18. As a ballistic missile impacts a Planar body 20, the missile can be broken and/or enlarged and flattened to increase its impact area and decrease the velocity of the missile. As depicted in FIG. 3, 5 and 6 in cross-section, article 18 comprises three distinct layers 22, 24 and 26, each consisting of a plurality of fibrous layers 12, stitched together by horizontal stitches 14 and vertical stitches 16 (not depicted). Layer 22 is the outer layer which is exposed to the environment, and layer 26 is the inner layer closest to the body of the wearer. The two covering layers 22 and 26 sandwich a ballistic layer 24, which, in the body armor of the figures comprises a plurality of stitched layers 12 having a plurality of planar bodies 20 partially covering both outer surfaces of said plurality of layers 12 forming a pattern of covered areas 28 and uncovered areas 30 on the outer surfaces. As shown in FIG. 3, the plurality of planar bodies 20 are positioned on the two surfaces such that the covered areas 28 on one surface are aligned with the uncovered areas 30 on the other surface. In the preferred embodiments of the invention depicted in FIG. 3, each planar body 20 is uniformly larger than its corresponding uncovered area 30 such that planar bodies 20 adjacent to an uncovered area 30 partially overlap with the corresponding planar body 20 (of the area 30) on the other outer surface of the plurality of layers 12 by some portion 32. The degree of overlap may vary widely, but in general is such that preferably more than about 90 area %, more preferably more than about 95 area % and most preferably more than about 99 area % of the uncovered areas 30 on an outer surface of the plurality of layers 12 are covered by its corresponding planar body 20 on the other outer surface of the plurality of layers 12

FIG. 4 depicts a variant of the embodiment of FIG. 3 which differs by placing planar bodies 20 on a surface of layer 26 and on a surface of layer 24 Corresponding parts are referred to by like numerals As depicted in the FIGURES, the position of planar bodies 20 can vary widely. For example, planar bodies 20 may be on an outside surface of a fibrous layer 12 or may be encapsulated inside of the plurality of fibrous layers 12 on interior surfaces. As depicted in FIGS. 3 to 6, planar bodies 20 are preferably space filling and will provide more than one continuous or semi-continuous seam, preferably two or three and more preferably three continuous or semi-continuous seams in different directions which preferably intersect at an angle with each other (more preferably at an angle of about 60°) in order to allow flexing in multiple directions.

Figure 7:
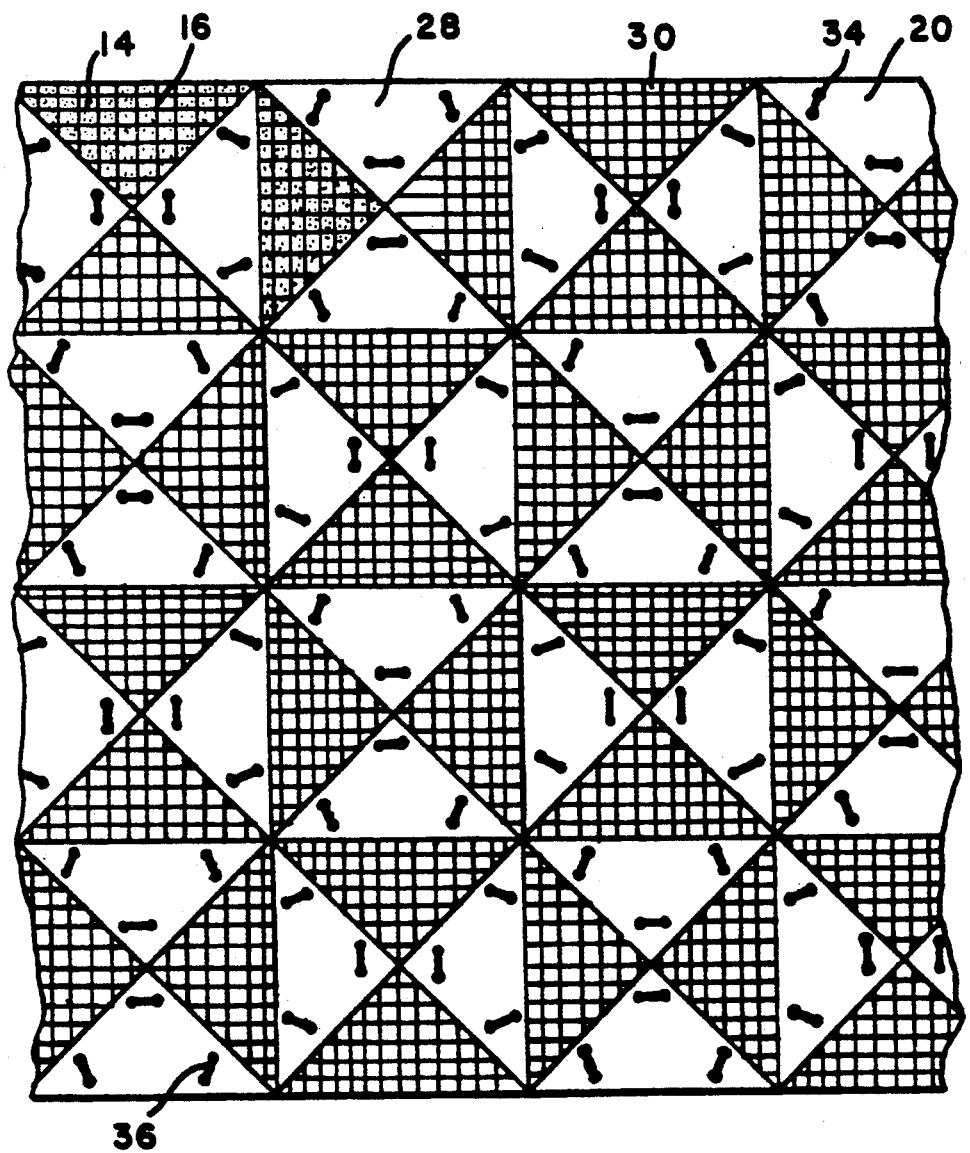
FIG. 7 is a fragmentary frontal view of the body armor of this invention of FIG. 3 in which certain selected layers have been cut away to depict of right angle triangular shaped rigid panels laminated and sewn on both sides of a stitched fabric.
Figure 8:
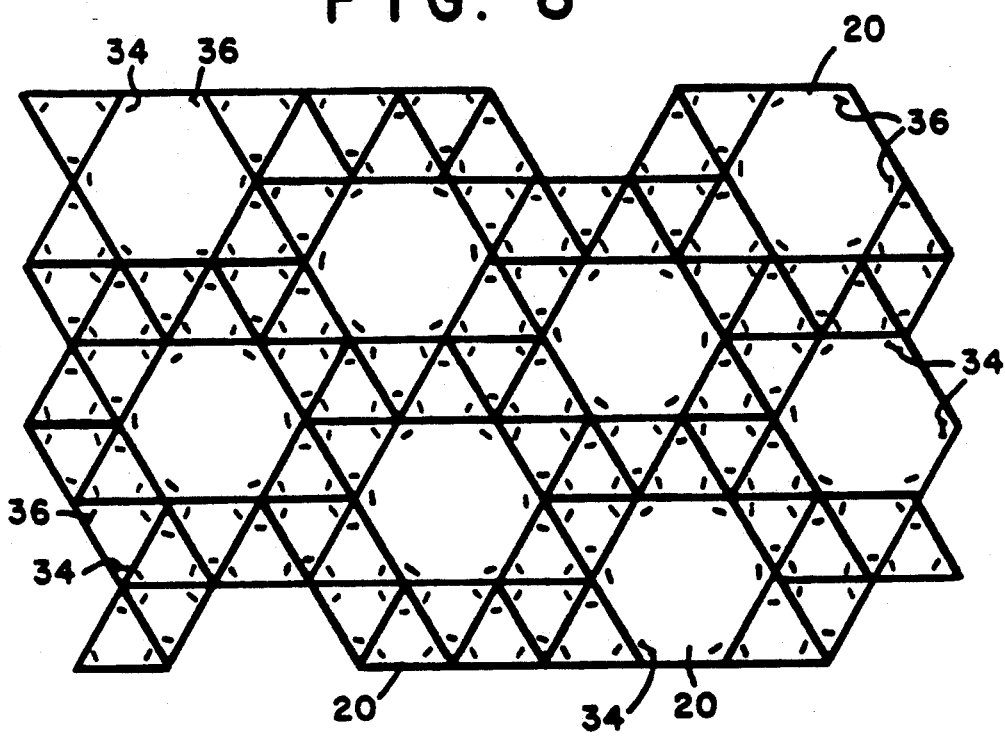
FIG. 8 is a fragmentary frontal view of another embodiment of this invention similar to that of FIG. 3 in which certain selected layers have been cut away to depict shaped rigid panels laminated to one side of the fabric in which the panels are in the shape of equilateral triangles and hexagons.
Figure 9:
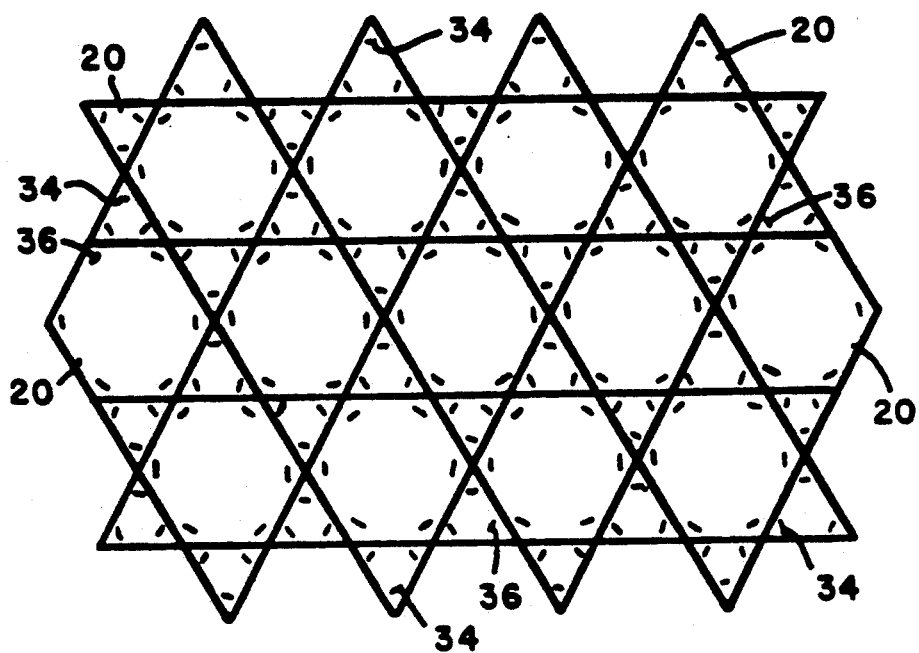
FIG. 9 is a fragmentary frontal view of another embodiment of this invention similar to that of FIG. 3 having shaped rigid panels laminated to one side of the fabric in which the panels are in the shape of equilateral triangles and hexagons.

Fixation of planar bodies 20 to a fibrous layer 12 as continuous sheet may cause stiffening of the structure reducing its flexibility. Although for certain applications this may be acceptable provided that article 10 has the required degree of flexibility, for many applications where relatively high penetration resistance and flexibility are desired, such as a ballistic resistant vest, it is desirable to affix planar bodies 20 to the fibrous layer 12 such that the desired flexibility is obtained. This is preferably accomplished by affixing planar bodies 20 as discontinuous geometric shapes. Preferred geometric shapes will be space filling and will preferably provide substantially continuous seams having three different seam directions to allow flexing in multiple directions, as depicted in FIGS. 5 and 6. A preferred construction consists of planar bodies 20 in the shape of triangles (preferably right and equilateral triangles and more preferably equilateral triangles) which are arranged to be space filling as depicted in FIGS. 5 and 6. A desirable modification to this construction is the inclusion of compatible geometric shapes such as hexagons, parallelograms, trapezoids and the like, which correspond to shapes obtainable by fusion of two or more triangles at appropriate edges. The most preferred compatible shapes are hexagons as depicted in FIGS. 7 and 8. It should be appreciated that while in FIGS. 7 and 8, the hexagonal and triangular shaped bodies are positioned on the same surface of layer 12, such positioning is not critical and bodies 20 can be conveniently placed on more than one surface, as for example in FIGS. 3 to 6. As shown in FIG. 9, in the most preferred embodiments of the invention planar bodies 20 are truncated or rounded at the edges and preferably includes eyes 34 for stitching planar bodies 20 to a surface of layer 12 by way of stitches 36. In these embodiments curvilinear planar bodies 20, such as circular or oval shaped bodies are positioned at the truncated edges to provide additional penetration resistance. Alternatively, a mixture of totally or partially truncated planar bodies 20 and partially truncated or untruncated planar bodies 20 can be used when the various bodies 20 are positioned such that the open spaces at the truncated ends can be covered by the un-truncated ends of the partially truncated or untruncated adjacent planar bodies 20. Flexibility can also be enhanced by having the point of attachment of bodies 20 away from the boundary of the body (See FIGS. 5 and 6). This enhances flexibility by allowing layer 12 to flex away from planar body 20. Additional flexibility can be achieved by providing spacer (not depicted) between layer 12 and planar bodies 20. Such space filling constructions allow a wide range of compromises between flexibility and minimization of seams, and penetration resistance.

An alternative to discontinuous geometric shapes is the use of relatively rigid penetration resistant planar bodies 20 containing slits, perforations and the like. The use of slits, perforations and the like can provide for enhanced ballistic protection while at the same time not affecting the flexibility of the ballistic article to a significant extent. It is desirable that slits, perforations and the like be aligned so that there are, two or three (preferably two or three more preferably three) directions along which planar bodies 20 can easily flex, in an analogous manner to that described previously for the individual geometric shapes.

The position of planar bodies 20 can vary widely. For example, planar bodies 20 may be on an outside surface of a fibrous layer 12 or may be encapsulated inside of the plurality of fibrous layer 12 on an interior surface. As depicted in FIGS. 3 to 6, planar bodies 20 are preferably space filling and will provide more than one continuous seam direction preferably, three or more continuous seams in order to allow flexing in multiple directions.

As shown in FIGS. 3 and 4, in the preferred embodiments of this invention, article 20 includes a plurality of fibrous layers 12 in which rigid substantially planar bodies 20 in adjacent layers 12 are offset to provide for continous and overlapping rigid ballistic protection. In these embodiments, as shown in FIGS. 4 to 7 article 10 preferably includes at least two layers 12 in which each layer 12 is partially covered with planar bodies 20, preferably forming an alternating pattern of covered areas 28 and uncovered areas 30. These layers are positioned in article 10 such that uncovered areas 30 of one layer 12 are aligned with covered areas 28 of another layer 12 (preferably an adjacent layer) providing for partial or complete coverage of the uncovered areas of one layer 12 by the covered areas of an another layer 12. Alternatively, another preferred embodiment as depicted in FIGS. 3, 4, 5 and 6 includes a layer 12 in which each side of the layer is partially covered with bodies 20 where the bodies are positioned such that covered areas 28 on one side of the layer are aligned with the uncovered areas 30 on the other side of the layer. In the preferred embodiments of the invention, the surface of layer 12 is covered with planar bodies 20 such that the bodies are uniformly larger than the uncovered mated surface of the other layer 12 or the other surface of the same layer providing for complete overlap. This is preferably accomplished by truncation of the edges of the bodies 20 or otherwise modification of such edges to allow for closest placement of bodies 20 on the surface such that a covered area is larger than the complimentary uncovered area 30. Extensive disalignment between the various fibrous layers 12 is prevented by the securing means 14 and 16.

The shape of planar bodies 20 may vary widely For example, planar bodies 20 may be of regular shapes such as hexagonal, triangular, square, octagonal, trapezoidal, parallelogram and the like, or may be irregular shaped bodies of any shape or form. In the preferred embodiments of the invention, planar bodies 20 are of regular shape and in the more preferred embodiments of the invention planar bodies 20 are triangular (preferably right and equilateral triangles, and more preferably equilateral triangles) shaped bodies or a combination of triangular shaped bodies and hexagonal shaped bodies which provide for relative improved flexibility relative to ballistic article having planar bodies 20 of other shapes of equal area.

Means for attaching planar bodies 20 to fibrous layer 12 may vary widely and may include any means normally used in the art to provide this function. Illustrative of useful attaching means are adhesive such as those discussed in R.C. Liable, *Ballistic Materials and Penetration Mechanics*, Elsevier Scientific Publishing Co. (1980) as for example bolts, screws, staples, mechanical interlocks, stitching and the like, or a combination of any of these conventional methods. As depicted in FIGS. 5 and 6 in the preferred embodiments of the invention, planar bodies 20 are stitched to a surface of layer 12 by way of stitches 36 and eyes 34 Optionally the stitching may be supplemented by adhesive.

Planar bodies 20 are comprised of a rigid ballistic material which may vary widely depending on the uses of article 18 The term "rigid" as used in the present specification and claims is intended to include semi-flexible and semi-rigid structures that are not capable of being free standing, without collapsing. The materials employed in the fabrication of planar bodies 20 may vary widely and may be metallic materials, semi-metallic materials, organic materials and/or an inorganic materials. Illustrative of such materials are those described in G. S. Brady and H. R. Clauser, *Materials Handbook*, 12th edition (1986).

Materials useful for fabrication of planar bodies include the ceramic materials Illustrative of useful metal and non-metal ceramic those described in F. F. Liable, *Ballistic Materials and Penetration Mechanics, Chapters 5-7* (1980) and include single oxides such as aluminum oxide ($Al_2O_3$), barium oxide (BaO), beryllium oxide (BeO), calcium oxide (CaO), cerium oxide ($Ce_2O_3$ and $CeO_2$), chromium oxide ($Cr_2O_3$), dysprosium oxide ($Dy_2O_3$), erbium oxide ($Er_2O_3$), europium oxide: (EuO, $Eu_2O_3$, and $Eu_2O_4$), ($Eu_{16}O_{21}$), gadolinium oxide ($Gd_2O_3$), hafnium oxide ($HfO_2$), holmium oxide ($Ho_2O_3$), lanthanum oxide ($La_2O_3$), lutetium oxide ($Lu_2O_3$), magnesium oxide (MgO), neodymium oxide ($Nd_2O_3$), niobium oxide (NbO, $Nb_2O_3$, and $NbO_2$), ($Nb_2O_5$), plutonium oxide; (PuO, $Pu_2O_3$, and $PuO_2$), praseodymium oxide: ($PrO_2$, $Pr_6O_{11}$, and $Pr_2O_3$), promethium oxide: ($Pm_2O_3$), samarium oxide (SmO and $Sm_2O_3$), scandium oxide ($Sc_2O_3$), silicon dioxide ($SiO_2$2), strontium oxide ($S_4O$), tantalum oxide ($Ta_2O_5$), terbium oxide ($Tb_2O_3$ and $Tb_4O_7$), thorium oxide ($ThO_2$), thulium oxide ($Tm_2O_3$), titanium oxide (TiO, $Ti_2O_3$, $Ti_3O_5$ and $TiO_2$), uranium oxide ($UO_2$, $U_3O_8$ and $Uo_3$), vanadium oxide (VO, $V_2O_3'$ $Vo_2$ and $V_2O_5$), ytterbium oxide ($Yb_2O_3$), yttrium oxide ($Y_2O_3$), and zirconium oxide ($ZrO_2$). Useful ceramic materials also include boron carbide, zirconium carbide, beryllium carbide, aluminum beride, aluminum carbide, boron carbide, silicon carbide, aluminum carbide, titanium nitride, boron nitride, titanium carbide titanium diboride, iron carbide, iron nitride, barium titanate, aluminum nitride, titanium niobate, boron carbide, silicon boride, barium titanate, silicon nitride, calcium titanate, tantalum carbide, graphites, tungsten; the ceramic alloys which include cordierite/MAS, lead zirconate titanate/PLZT, alumina-titanium carbide, alumina-zirconia, zirconia-cordierite/ZrMAS; the fiber reinforce ceramics and ceramic alloys; glassy ceramics; as well as other useful materials. Preferred ceramic materials are aluminum oxide, and metal and non-metal nitrides, borides and carbides Planar bodies 20 may also be formed from one or more thermoplastic materials, one or more thermosetting materials or mixtures thereof. Useful materials include relatively high modulus (equal to or greater than about 6000 psi (41,300 kPa)) polymeric materials such as polyamides as for example aramids, nylon-66, nylon-6 and the like; polyesters such as polyethylene terephthalate, polybutylene terephthalate, and the like; acetalo; polysulfones; polyethersulfones; polyacrylates; acrylonitrile/butadiene/styrene copolymers; poly (amideimide); polycarbonates; polyphenylenesulfides; polyurethanes; polyphenylene oxides; polyester carbonates; polyesterimides; polyimides; polyetheretherketone; epoxy resins; phenolic resins; silicones; polyacrylates; polyacrylics; vinyl ester resins; modified phenolic resins; unsaturated polyester; allylic resins; alkyd resins; melamine and urea resins; polymer alloys and blends of thermoplastics and/or thermosetting resins and interpenetrating polymer networks such as those of polycyanate ester of a polyol such as the dicyanoester of bisphenol-A and a thermoplastic such as polysulfone.

Useful materials also include relatively low modulus Polymeric materials (modulus less than about 6000 psi (41,300 kPa) as for example elastomeric materials. Representative examples of suitable elastomers have their structures, properties, formulations together with cross-linking procedures summarized in the Encyclopedia of Polymer Science, Volume 5 in the section Elastomers-Synthetic (John Wiley & Sons Inc., 1964). For example, any of the following materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticers well known in the art, butadiene acrylonitrile elastomers, poly(isobutylene-coisoprene), polyacrylates, polyesters, polyether, fluoroelastomers, silicone elastomers, thermoplastic elastomers,copolymers of ethylene and a conjugated monomer such as butadiene and isoprene or a vinyl aromatic monomer such as styrene, vinyl toluene or t-butyl styrene.

These polymeric materials may be reinforced by high strength fibers described above for use in the fabrication of fibers layer 12, for example, organic filaments such as aramid fibers such as those, polyethylene fibers and mixtures thereof, and inorganic, metallic or semimetallic filaments as for example those materials described as useful in the fabrication of planar bodies 20 such as boron fibers, ceramic fibers, carbon and graphite fibers, and the like. In these embodiments of the invention, the fibers are dispersed in a continuous phase of a matrix material which preferably substantially coats each fiber contained in the fiber bundle. The manner in which the fibers are dispersed may vary widely. The fibers may have varying configurations of the fibrous network in fibrous layer 12. For example, the fibers may be in the form of woven or non-woven fabrics. The fibers may be aligned in a substantially parallel, undirectional fashion, or fibers may be aligned in a multidirectional fashion, or fibers may be aligned in a multidirectional fashion with filaments at varying angles with each other. In the preferred embodiments of this invention, fibers in each layer are aligned in a substantially parallel, unidirectional fashion such as in a prepreg, pultruded sheet and the like. One such suitable arrangement is where the planar bodies 20 comprise a plurality of layers or laminates in which the coated fibers are arranged in a sheet-like array and aligned parallel to one another along a common fiber direction. Successive layers of such coated, uni-directional fibers are rotated with respect to the previous layer. An example of such laminate structures are composites with the second, third, fourth, fifth layers etc. rotated $+45°$, $-45°$, $90°$ and $0°$, with respect to the first layer, but not necessarily in that order. Other examples include composites with $0°/90°$ layout of yarn or fibers. Techniques for fabricating these laminated structures are described in greater detail in U.S. Pat. Nos. 4,916,000; 4,623,547; 4,748,064; 4,457,985 and 4,403,012.

Useful materials for fabrication of bodies 20 also include metals such as nickel, manganese, tungsten, magnesium, titanium, aluminum and steel plate and the like. Illustrative of useful steels are carbon steels which include mild steels of grades AISI 1005 to AISI 1030, medium-carbon steels of the grades AISI 1030 to AISI 1055, high-carbon steels of the grades AISI 1060 to ISI 1095, free-machining steels, low-temperature carbon steels, rail steel, and superplastic steels; high-speed steels such as tungsten steels, and cobalt steels; hot-die steels; low-alloy steels; low expansion alloys; mold-steel; nitriding steels for example those composed of low-and medium-carbon steels in combination with chromium and aluminum, or nickel, chromium, and aluminum; silicon steel such as transformer steel and silicon-manganese steel; ultrahigh-strength steels such as medium-carbon low alloy steels, chromium-molybdenum steel, chromium-nickel-molybdenum steel, iron-chromium-molybdenum-cobalt steel, quenched-and-tempered steels, cold-worked high-carbon steel; and stainless steels such as iron-chromium alloys austenitic steels, and chromium-nickel austenitic stainless steels, and chromium-manganese steel. Useful materials also include alloys such a manganese alloys, such as manganese aluminum alloy, manganese bronze alloy and the like; nickel alloys such as, nickel bronze, nickel-cast iron alloy, nickel-chromium alloys, nickel-chromium steel alloys, nickel copper alloys, nickel-chromium alloys, nickel-chromium steel alloys, nickel copper alloys, nickel-molybdenum iron alloys, nickel-molybdenum steel alloys, nickel-silver alloys, nickel-steel alloys and the like; iron-chromium-molybdenum-cobalt-steel alloys; magnesium alloys; aluminum alloys such as those of aluminum alloy 1000 series of commercially pure aluminum, aluminum-magnesium-manganese alloys, aluminum-magnesium alloys, aluminum-copper alloys, aluminum-silicon-magnesium alloys of 6000 series, aluminum-copper-chromium of 7000 series, aluminum casting alloys; aluminum brass alloys and aluminum bronze alloys and the like.

Planar bodies 20 may also be formed from a rigid multilayered laminate formed from a plurality of fibrous layers These layers may be consolidated into a body through use of conventional consolidation means such as adhesives, bolts, staples, screws, stitching and the like.

The composites of this invention can be used for conventional purposes For example, such composites can be used in the fabrication of penetration resistance articles and the like using conventional methods. For example, such penetration resistant articles include meat cutter aprons, protective gloves, boots, tents, fishing gear and the like. The articles are particularly useful in the fabrication of body armors or penetration resistant articles such as "bulletproof" lining for example, or a raincoat because of the flexibility of the article and its enhanced ballistic resistance.

The following examples are presented to provide a more complete understanding of the invention and are not to be construed as limitations thereon In ballistic studies, the specific weight of the shells and plates can be expressed in terms of the areal density (ADT). This areal density corresponds to the weight per unit are of the ballistic resitant armor. In the case of filament reinforced composites, the ballistic resistance of which depends mostly on filaments, another useful weight characteristic is the filament areal density of the composite. This term corresponds to the weight of the filament reinforcement per unit are of the composite (AD).

EXAMPLE I

Preparation and Puncture of Sewn Fabrics

A series of 9 inch (22.9 cm) square fabric targets were prepared by sewing multiple fabric layers together using a Singer industrial sewing machine Model #111 W113. Square were cut with yarn fill direction parallel to one set of sides and the warp direction parallel to the other set of sides. The multiple fabric layers were held in a jig and the target was indexed the desired distance before sewing each seam in order to crete uniformly parallel lines having a relatively constant seam distance. Target descriptions are given in the following Table 1.

TABLE 1
PARAMETERS FOR SEWN PLAIN WEAVE FABRIC TARGETS

| SAMPLE NO. | TYPE | FABRIC LAYERS | YARN | STITCH LENGTH in. (cm) |
|---|---|---|---|---|
| 1 | PW-650[1] | 6 | NONE | — |
| 2 | PW-650 | 6 | K-1[3] | 0.125(0.318) |
| 3 | PW-650 | 6 | K-1 | 0.147(0.373) |
| 4 | PW-650 | 6 | K-1 | 0.125(0.318) |
| 5 | PW-650 | 6 | K-1 | 0.143(0.363) |
| 6 | PW-215[2] | 10 | NONE | — |
| 7 | PW-215 | 10 | K-1 | 0.150(0.381) |
| 8 | PW-215 | 10 | K-1 | 0.143(0.363) |
| 9 | PW-215 | 10 | K-1 | 0.143(0.363) |
| 10 | PW-215 | 10 | N-1[4] | 0.145(0.368) |
| 11 | PW-215 | 10 | N-1 | 0.145(0.368) |

SEAM

TABLE 1-continued
PARAMETERS FOR SEWN PLAIN WEAVE FABRIC TARGETS

| SAMPLE NO. | GEOMETRY | DISTANCE in(cm) | AD[7] (kg/m²) | ADT[8] (kg/m²) |
|---|---|---|---|---|
| 1 | — | — | 1.24 | 1.24 |
| 2 | C[5] | 0.161(0.409) | 1.34 | 1.42 |
| 3 | C | 0.125(0.318) | 1.36 | 1.44 |
| 4 | C | 0.159(0.404) | 1.33 | 1.42 |
| 5 | C | 0.105(0.267) | 1.31 | 1.45 |
| 6 | — | 0.125(0.318) | 1.28 | |
| 7 | C | 0.0625(0.159) | 1.32 | 1.40 |
| 8 | C | 0.0626(0.159) | 1.33 | 1.49 |
| 9 | L[6] | 0.0625(0.159) | 1.33 | 1.41 |
| 10 | C | 0.0625(0.159) | 1.33 | 1.58 |
| 11 | L | 0.0625(0.159) | 1.33 | 1.45 |

[1] "PW-650" is SPECTRA ® 1000 plain weave fabrics - 650 denier - 34 × 34 yarns/in (13.4 yarn/cm) manufactured and sold by Allied-Signal, Inc.
[2] "PW-215" is SPECTRA ® 1000 plain weave fabrics - 215 denier - 62 × 62 yarns/in (24.4 yarn/cm) manufactured and sold by Allied-Signal Inc.
[3] "K-1" IS KEVLAR ® sewing thread - 410 denier, tenacity of 19.1 g/denier and modulus of 378 g/denier.
[4] "N-1" is nylon sewing thread - 535 denier, tenacity of 6.33 g/denier and modulus of 32 g/denier.
[5] "C" indicates that the seams are cross-stitched at right angles to each other and parallel to one yarn direction in fabric.
[6] "L" indicates that the seams are sewn as a set of parallel lines.
[7] "AD" is the fabric area density in kg/m².
[8] "ADT" is the fabric and sewing yarn areal density in kg/m².

The penetration resistance of certain of the fabric samples described in Table I was determined using a small diameter (2.67 mm–0.105 in.) probe. The probe was cylindrical with pointed impact end (included angle for point was 53 degrees). A servo-hydraulic Instron test apparatus designed for high velocity loading was used to provide an impacting velocity of approximately 12 ft./S (3.66 m/S). Samples were held between two flat circular rings having an inside diameter of 3 inches. (7.62 cm). The results are set forth in the following Table 2.

TABLE 2
PENETRATION RESISTANCE OF SEWN PLAIN WEAVE FABRIC TARGETS

| SAMPLE NO. | YARN | STITCH LENGTH in (cm) | SEAM DISTANCE in (cm) | PENETRATION lb. | FORCE[3] N |
|---|---|---|---|---|---|
| (A) 650 DENIER SPECTRA ® PLAIN WEAVE FABRIC - CROSS-STITCHED | | | | | |
| 1 | NONE | — | — | 107 | 476 |
| 2 | K-1[1] | 0.161(0.409) | 0.161(0.409) | 106 | 471 |
| 3 | K-1 | 0.147(0.373) | 0.125(0.318) | 122 | 543 |
| 4 | N-1[2] | 0.125(0.318) | 0.159(0.404) | 99 | 440 |
| 5 | N-1 | 0.143(0.363) | 0.105(0.267) | 111 | 494 |
| (B) 215 DENIER SPECTRA ® PLAIN WEAVE FABRIC - CROSS-STITCHED | | | | | |
| 6 | NONE | — | — | 100 | 445 |
| 7 | K-1 | 0.150(0.381) | 0.125(0.318) | 163 | 725 |
| 8 | K-1 | 0.143(0.363) | 0.0625(0.159) | 204 | 907 |
| 9 | N-1 | 0.145(0.368) | 0.0625(0.159) | 173 | 770 |
| (C) 215 DENIER SPECTRA ® PLAIN WEAVE FABRIC - LINE-STITCHED | | | | | |
| 10 | K-1 | 0.143(0.363) | 0.0625(0.159) | 160 | 712 |
| 11 | N-1 | 0.145(0.368) | 0.0625(0.159) | 151 | 672 |

| SAMPLE NO. | PENETRATION ENERGY[4] (J) | SPECIFIC FORCE[5] N · kg/m2 | SEAT[6] (J · kg/m2) |
|---|---|---|---|
| (A) 650 DENIER PLAIN WEAVE FABRIC-CROSS-STITCHED | | | |
| 1 | 3.23 | 384 | 2.60 |
| 2 | 2.78 | 351 | 1.96 |
| 3 | 3.10 | 377 | 2.15 |
| 4 | 2.97 | 310 | 2.09 |
| 5 | 3.31 | 340 | 2.28 |
| (B) 215 DENIER PLAIN WEAVE | | | |

TABLE 2-continued
PENETRATION RESISTANCE OF SEWN PLAIN WEAVE FABRIC TARGETS

| | FABRIC-CROSS-STITCHED | | |
|---|---|---|---|
| 6 | 3.23 | 348 | 2.27 |
| 7 | 5.13 | 549 | 3.66 |
| 8 | 6.52 | 643 | 4.38 |
| 9 | 5.16 | 487 | 3.26 |
| | (C) 215 DENIER PLAIN WEAVE FABRIC-LINE-STITCHED | | |
| 10 | 5.07 | 505 | 3.60 |
| 11 | 3.58 | 463 | 2.47 |

[1]"K-1" is KEVLAR ® sewing thread of 410 denier, tenacity of 19.2 g/denier or modulus of 738 g/denier.
[2]"N-1" is nylon - 66 sewing thread of 535 denier, tenacity of 6.33 g/denier or modulus of 32 g/denier.
[3]"Penetration Force" is the force observed during penetration.
[4]"PENETRATION ENERGY" is the energy absorbed to peak force.
[5]"SPECIFIC FORCE" - is the peak force divided by ADT.
[6]"SEAT" - is the energy absorbed to peak force divided by ADT.

EXAMPLE II

A 2 cm square in a woven fabric (basket weave from 215 denier Spectra ® 1000 polyethylene yarn) and Spectra Shield ® prepared (80% Spectra ® 1000, and 20 wt % Kraton ® d1107) were hand sewn with 555 denier Spectra ® 1000 stitching yarn in the central area of the target using stitches approximately 3 mm apart. The penetration resistance of these stitched targets was evaluated by impacting the target at 12 ft./S (3.66 m/S) with 0.07 inch (2.72 mm) diameter pointed probe. The results, using the fabric target, are shown in Table 3 and using the Spectra ® target in Table 4. For comparison purposes each table includes punctured resistance control for an unstitched control using the above described procedure.

3 "Penetration force" is force observed during penetration.

TABLE 3
PUNCTURE RESISTANCE OF FABRIC TARGETS

| SAMPLE NO. | ADT (kg/m²) | ENDS/IN. | FABRIC LAYERS | PEAK FORCE lb. (kg) | PENETRATION ENERGY (J) |
|---|---|---|---|---|---|
| | (A) STITCHED FABRIC | | | | |
| 1 | 2.48 | 82 × 82 | 13 | 119(54.03) | 2.73 |
| | (B) UNSTITCHED CONTROL | | | | |
| 2 | 2.03 | 82 × 82 | 13 | 87(39.50) | 1.96 |

TABLE 4
PUNCTURE RESISTANCE OF SPECTRA ® SHIELD COMPOSITES

| SAMPLE NO. | ADT (kg/m²) | PREPREG LAYERS PER PANEL | NO OF PANELS | PEAK FORCE lb. | TOTAL ENERGY (J) |
|---|---|---|---|---|---|
| | (A) STITCHED | | | | |
| 1 | 2.52 | 2 | 18 | 92.0 (41.77) | 2.20 |
| | (B) UNSTITCHED CONTROL | | | | |
| 2 | 2.07 | 2 | 18 | 91.8 (41.68) | 1.68 |

What is claimed is:

1. An improved penetration resistant article of the type comprising a plurality of flexible fibrous layers, at least two of which are secured together by a securing means, the improvement comprising a securing means which extends along at least two adjacent paths wherein the distance between said paths is less than ⅛ in (0.3175 cm).

2. The improved article of claim 1 wherein said securing means comprises a plurality of first stitches extending along all or a portion of at least two adjacent paths.

3. The improved article of claim 2 wherein said first stitches are formed from fiber having a tenacity of at least about 15 grams/denier and tensile modulus of at least about 200 grams/denier.

4. The improved article of claim 3 wherein said tenacity is from about 20 to about 50 grams/denier and said tensile modulus is from about 200 to about 3000 grams/denier.

5. The improved article of claim 4 wherein said tenacity is from about 25 to about 50 grams/denier and said tensile modulus in from about 40 to about 3000 gram/denier.

6. The improved article of claim 5 wherein said tenacity is from about 30 grams/denier to about 50 grams/denier and tensile modulus said is from about 1000 to about 3000 grams/denier.

7. The improved article of claim 6 wherein said modulus is from about 1500 to about 3000 grams/denier.

8. The improved article of claim 2 wherein said stitches are formed from fiber selected from the group consisting of polyethylene fiber, aramid fiber, nylon fiber and combination thereof.

9. The improved article of claim 8 wherein said fiber is polyethylene fiber, aramid fiber and combinations thereof.

10. The improved article of claim 9 wherein said fiber is polyethylene fiber.

11. The improved article of claim 9 wherein said fiber is aramid fiber.

12. The improved article of claim 2 wherein said plurality of said first stitches are parallel or substantially parallel.

13. The improved articles of claim 12 which further comprises a plurality of parallel or substantially parallel second stitches wherein the distance between said plurality of second stitches is less than ⅛ in (0.3175 cm.), said plurality of second stitches intersecting said plurality of first stitches at an angle.

14. The improved article of claim 13 wherein said angle is from about 45° to about 90°.

15. The improved article of claim 14 wherein said angle is about 90°.

16. The improved article of claim 1 wherein the distances between said paths is from about 1/64 to less than ⅛ in.

17. The improved article of claim 16 wherein the distances/ between said paths is from about 1/32 to about 1/10 in.

18. The improved article of claim 17 wherein said distance is from about 1/16 to about 1/10 in.

19. The improved article of claim 18 wherein said distance is from about 1/16 to about 1/12 inch.

20. The improved article of claim 2 wherein said stitch length is equal to or less than about 6.4 mm (0.16 in).

21. The improved article of claim 20 wherein said stitch length is equal to or less than about 4 mm.

22. The improved article of claim 21 wherein said stitch length is from about 1 to about 4 mm.

23. The improved article of claim 22 wherein said stitch length is from about 2.5 to about 3.5 mm.

24. The improved article of claim 1 which further comprises a plurality of rigid bodies arranged with said plurality of fibrous layers and affixed thereto.

25. The improved article of claim 1 said fibrous layers comprising fibers having a tensile strength of at least about 7 grams/denier, a tensile modulus of at least about 160 grams/denier and an energy-to-break of at least about 30 joules/gram.

26. The improved article of claim 1 wherein fibers have a tenacity equal to or greater than about 20 g/d, a tensile modulus equal to or greater than about 500 g/d and an energy-to-break equal to or greater than about 40 J/g.

27. The improved article of claim 26 wherein said fibers are polyethylene fibers, aramid fibers or a combination thereof.

28. The improved article of claim 27 wherein said fibers are polyethylene fibers.

29. The improved article as recited in claim 27 wherein said fibers are aramid fibers.

30. The improved article of claim 27 wherein said fibers are a combination of polyethylene fibers and aramid fibers.

31. The improved article of claim 1 wherein said fibrous layer comprises more than one layer in which the fibers in each layer are arranged parallel or substantially parallel to one another along a common fiber direction, with adjacent layers aligned at an angle with respect to the longitudinal fiber axis of the fiber contained in said layers.

32. The improved article of claim 31 wherein said angle is from about 45° to about 90°.

33. The improved article of claim 32 wherein said angle is about 90° C.

34. The improved article of claim 33 wherein said fibrous layer comprises a woven fabric, a non-woven fabric or a combination thereof.

35. The improved article of claim 1 or 31 wherein said fibrous layers are in a polymer matrix.

36. The improved article of claim 24 wherein said rigid bodies are in the shape of or substantially in the shape of equilateral triangles, or said bodies are in the shape of or substantially in the shape of equilateral triangles and hexagons.

37. The improved article of claim 24, wherein said rigid bodies are sewn and laminated or laminated and sewn to said fibrous layer.

38. The improved article of claim 24, wherein said rigid bodies are formed from a metal, a ceramic, a polymeric composite comprising a plurality of fibrous layers in a matrix or a combination thereof.

39. The improved article of claim 9 wherein said fiber is a combination of polyethylene fibers and aramid fibers.

40. The improved article of claim 8 wherein said fibrous layer comprises fibers selected from the group consisting of polyethylene fiber, aramid fiber, nylon fiber and combinations thereof.

41. The improved article of claim 40 wherein the distance between said first stitches is from about 1/32 to about 1/10 in.

42. The improved article of claim 41 wherein said fiber forming said fibrous layer and said stitches is polyethylene fiber, aramid fiber or a combination thereof.

43. The improved article of claim 42 wherein said plurality of said first stitches are parallel or substantially parallel.

44. The improved article of claim 43 wherein said fibrous layer comprises more than one layer in which the fibers in each layer are arranged parallel or substantially parallel to one another along a common fiber direction in a polymeric matrix material, with adjacent layers aligned at an angle with respect to the longitudinal fiber axis of the fiber contained in said layers.

45. The improved article of claim 44 wherein said angle is about 90° C.

46. The improved article of claim 43 wherein said fibrous layer comprises a woven fabric, a non-woven fabric or a combination thereof and said fibers are aramid fibers or a combination of aramid fibers and polyethylene fibers.

47. The improved article of claim 44 wherein said fiber forming said fibrous layers are aramid fibers or a combination of aramid fibers and polyethylene fibers.

* * * * *

UNITED STATES PATENT AND TRADEMARK OFFICE
CERTIFICATE OF CORRECTION

PATENT NO. : 5,185,195
DATED : February 9, 1993
INVENTOR(S) : Harpell et al.

It is certified that error appears in the above-identified patent and that said Letters Patent is hereby corrected as shown below:

Col. 20, line 54, delete "/" after the word --distances--

Signed and Sealed this

Twenty-third Day of November, 1993

Attest:

BRUCE LEHMAN

Attesting Officer

Commissioner of Patents and Trademarks